(12) United States Patent
Lyon et al.

(10) Patent No.: US 9,026,168 B2
(45) Date of Patent: May 5, 2015

(54) TRANSMITTING PORTIONS OF A DATA BLOCK IN TRANSMISSION BURSTS FROM A PLURALITY OF TRANSMITTERS

(71) Applicant: L-3 Communications Corp., New York, NY (US)

(72) Inventors: Scott M. Lyon, South Weber, UT (US); Neil K. Harker, South Jordan, UT (US); Douglas H. Ulmer, Midway, UT (US); David M. Ellis, Salt Lake City, UT (US)

(73) Assignee: L-3 Communications Corp., New York, NY (US)

( * ) Notice: Subject to any disclaimer, the term of this patent is extended or adjusted under 35 U.S.C. 154(b) by 125 days.

(21) Appl. No.: 14/038,485

(22) Filed: Sep. 26, 2013

(65) Prior Publication Data

US 2015/0087349 A1 Mar. 26, 2015

(51) Int. Cl.
*H04B 7/00* (2006.01)
*H04W 52/24* (2009.01)

(52) U.S. Cl.
CPC .................................. *H04W 52/248* (2013.01)

(58) Field of Classification Search
USPC ........... 455/11.1, 12.1, 13.1, 13.2, 13.4, 41.1, 455/41.2, 553.1, 572, 573, 127.1, 507, 517, 455/522
See application file for complete search history.

(56) References Cited

U.S. PATENT DOCUMENTS

| | | | |
|---|---|---|---|
| 6,473,900 B1 * | 10/2002 | Pham et al. ...................... 725/63 |
| 7,190,690 B2 * | 3/2007 | Tuomela et al. .............. 370/347 |
| 7,330,706 B2 * | 2/2008 | Gentsch et al. ............ 455/127.1 |
| 7,403,546 B2 * | 7/2008 | Van Doninck et al. ....... 370/503 |
| 7,777,674 B1 | 8/2010 | Haddadin et al. |
| 7,877,057 B2 * | 1/2011 | Izumikawa et al. ................ 455/7 |
| 7,978,123 B2 | 7/2011 | Lam et al. |
| 8,107,826 B2 * | 1/2012 | Armstrong et al. ........... 398/193 |
| 8,126,433 B2 * | 2/2012 | Haartsen ....................... 455/411 |
| 8,155,049 B2 * | 4/2012 | Mow et al. .................... 370/315 |
| 8,565,246 B2 * | 10/2013 | Suzuki et al. ................. 370/401 |
| 8,633,766 B2 * | 1/2014 | Khlat et al. ................... 330/127 |
| 8,737,227 B2 * | 5/2014 | Hata et al. ..................... 370/236 |
| 2008/0285500 A1 * | 11/2008 | Zhang et al. .................. 370/315 |
| 2009/0097433 A1 * | 4/2009 | Shen et al. .................... 370/315 |

OTHER PUBLICATIONS

Wu et al., "Evolving Control for Distributed Micro Air Vehicles," IEEE (1999) pp. 174-179.
Fontana et al., "An Ultra Wideband Radar for Micro Air Vehicle Applications," IEEE Conference on Ultra Wideband Systems and Technologies (2002), pp. 187-192.

* cited by examiner

*Primary Examiner* — Tuan A Tran
(74) *Attorney, Agent, or Firm* — Kirton McConkie

(57) ABSTRACT

A cluster of communications platforms can comprise a master platform and support platforms. The master platform can partition a data block into data partitions and transmit the data partitions via a short range transmitter to the support platforms. Each support platform can include a high power storage device for powering long range burst transmissions of a subset of the data partitions to a distant receiver. Burst transmissions of data partitions by the same support platform can be separated by a charging time period that allows a high power storage device in the support platform to charge from a relatively low average power $P_a$ a relatively high power burst $P_B$ that is sufficient to transmit one of the data partitions to a distant receiver.

21 Claims, 9 Drawing Sheets

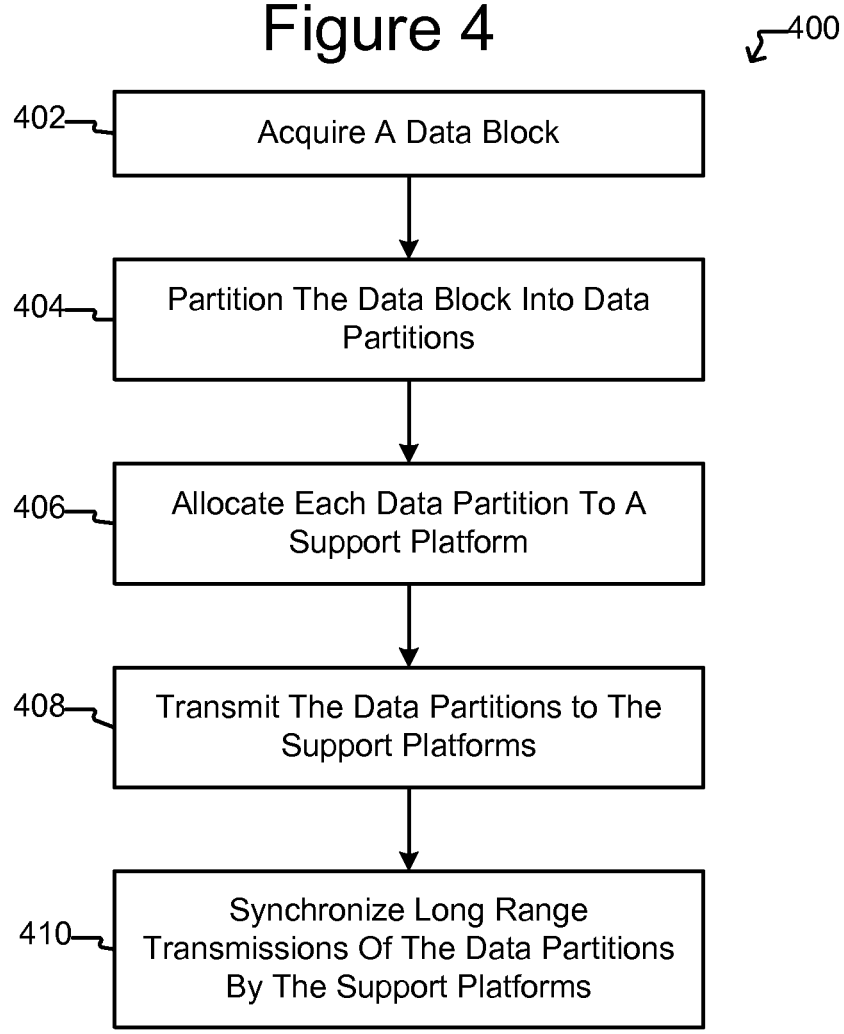
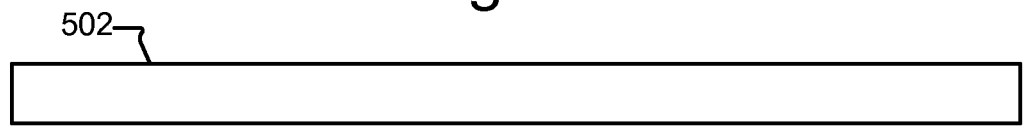

TRANSMITTING PORTIONS OF A DATA BLOCK IN TRANSMISSION BURSTS FROM A PLURALITY OF TRANSMITTERS

BACKGROUND

Generally speaking, the greater the distance over which an electromagnetic signal is to be transmitted, the greater the power required to transmit the signal. Thus, communications systems for transmitting data over long distances typically have high power requirements. High power supply systems, however, can be large and thus not compatible with small transmitting devices. Although the present invention is not limited to use with transmitting devices of any particular size, embodiments of the invention can transmit over long distances utilizing relatively low power. Embodiments of the invention can thus overcome the foregoing problem in the prior art and/or provide other advantages.

SUMMARY

In some embodiments, a process of transmitting data can include partitioning a data block into partitions at a master communications platform, and allocating each of the partitions to one of a plurality of support communications platforms located within a distance $D_C$ from the master communications platform. The process can also include transmitting the data partitions from long range transmitters in the support platforms to a distant receiver located at least a distance $D_R$ from the support platforms. The distance $D_R$ can be greater than the distance $D_C$. The transmitting can include the following at each of the support platforms: burst transmitting each data partition allocated to the support platform by providing a power burst $P_B$ for a burst time period $t_B$ to the long range transmitter in the support platform, and providing a charging time period $t_{ch}$ between each power burst $P_B$.

In some embodiments, a cluster of communications platforms can comprise a master communications platform and support communications platforms. The master communications platform can include a short range transmitter that requires an amount of power $P_C$ to transmit data over a distance $D_C$. Each support platform can include a receiver and a long range transmitter that requires a power $P_R$ to transmit data over a distance $D_R$, where the distance $D_R$ is greater than the distance $D_C$ and the power $P_R$ is greater than the power $P_C$. The master platform can include a power module capable of continuously supplying power $P_L$ to the short range transmitter, where the power $P_L$ is greater than the power $P_C$ but less than the power $P_R$. Each of the support platforms can include a power module capable of supplying continuously average power $P_a$ that is less than the power $P_R$, and only after a charging time period $t_{ch}$, supplying to the long range transmitter of the support platform a power burst $P_B$ only for a burst time period $t_B$ that is greater than or equal to the power $P_R$.

BRIEF DESCRIPTION OF THE DRAWINGS

FIG. 4 shows an example of a process for transmitting partitions of a data block from a plurality of the communications platforms according to some embodiments of the invention.

FIG. 5 is an example of a data block.

DETAILED DESCRIPTION OF EXEMPLARY EMBODIMENTS

This specification describes exemplary embodiments and applications of the invention. The invention, however, is not limited to these exemplary embodiments and applications or to the manner in which the exemplary embodiments and applications operate or are described herein. Moreover, the figures may show simplified or partial views, and the dimensions of elements in the figures may be exaggerated or otherwise not in proportion for clarity. In addition, as the terms "on," "attached to," or "coupled to" are used herein, one object (e.g., a material, a layer, a substrate, etc.) can be "on," "attached to," or "coupled to" another object regardless of whether the one object is directly on, attached, or coupled to the other object or there are one or more intervening objects between the one object and the other object. Also, directions (e.g., above, below, top, bottom, side, up, down, under, over, upper, lower, horizontal, vertical, "x," "y," "z," etc.), if provided, are relative and provided solely by way of example and for ease of illustration and discussion and not by way of limitation. In addition, where reference is made to a list of elements (e.g., elements a, b, c), such reference is intended to include any one of the listed elements by itself, any combination of less than all of the listed elements, and/or a combination of all of the listed elements.

As used herein, "substantially" means sufficient to work for the intended purpose. The term "ones" means more than one.

The following symbols have the meanings indicated: "+" means mathematical addition, "−" means mathematical subtraction, "*" means mathematical multiplication, and "/" means mathematical division.

Some embodiments of the invention can comprise a cluster of communications platforms in which a master communications platform allocates partitions of a data block to a plurality of support communications platforms. Each support platform can comprise a high power storage device for powering long range burst transmissions of the data partitions to a distant receiver. The master platform can synchronize data transmissions among the support platforms to provide a low level power supply in each support platform sufficient time between burst transmissions to fully recharge a high power storage device. The average power requirement of each support platform can be significantly less than the power required to transmit to the distant receiver. Moreover, loss of one of the platforms need not incapacitate the system because one or more of the other platforms can take up the workload of the lost platform and/or a new platform can be added to the cluster.

Figure 1:
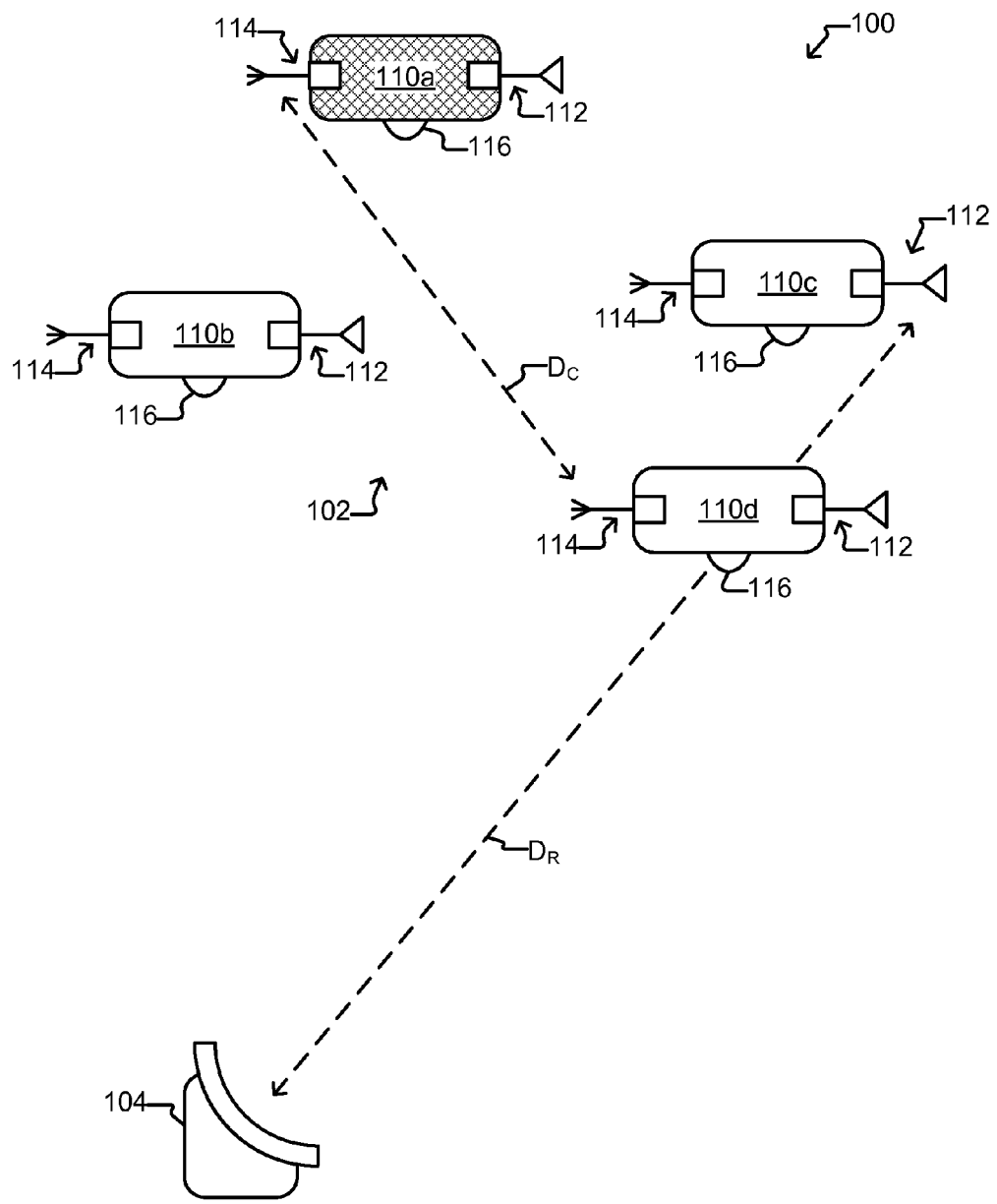
FIG. 1 illustrates an example of a communications system comprising a cluster of communications platforms and a distant receiver according to some embodiments of the invention.

FIG. 1 illustrates an example of a communications system 100 comprising a cluster 102 of communications platforms 110 and a distant receiver 104. In the example shown in FIG. 1, the platform 110a is a master communications platform, and the platforms 110b, 110c, 110d are support communications platforms. As will be seen, all of the platforms 110 in the cluster 102 can communicate with each other. Although four platforms 110 are shown in FIG. 1, the cluster 102 can comprise more or fewer platforms 110. In some embodiments, one or more of the platforms 110 can be switched between a master mode and a support mode and thus be capable of selectively functioning as a master platform 110a or a support platform 110b-110d.

The platforms 110 can be mobile or stationary, and the cluster 102 can thus be mobile, partially mobile, or stationary. The distant receiver 104 can also be mobile or stationary.

Suitable examples of the platforms 110 include mobile aircraft, watercraft, land craft, or space craft. For example, the platforms 110 can be micro-air vehicles. Other suitable examples of the platforms 110 include stationary communications, eavesdropping, or surveillance stations. Suitable examples of the distant receiver 104 include an antenna, which can be mounted on a mobile craft (e.g., an aircraft, watercraft, land craft, or space craft). Examples of a suitable stationary distant receiver 104 include an antenna site, a communications receiver station, or the like.

The communications platforms 110 can be located a relatively short distance from each other in the cluster 102 but a relatively long distance from the receiver 104. Thus, a distance $D_R$ between the closest platform 110 in the cluster 102 and the receiver 104 can be significantly greater than a distance $D_C$ between the master platform 110a and the closest support platform 110b-110d in the cluster 102. For example, the distance $D_R$ can be two, twenty, fifty, one-hundred, five-hundred, one thousand, ten-thousand, or more times greater than the distance $D_C$.

As shown in FIG. 1, a communications platform 110 can comprise a long range transmitter 112, a short range transceiver 114, and/or a data acquisition device 116. The long range transmitter 112 can be capable of transmitting to the receiver 104 and thus transmitting data at least over the distance $D_R$. The power required by the transmitter 112 to transmit data to the receiver 104 and thus at least over the distance $D_R$ is referred to herein as power $P_R$. The short range transceiver 114 can be capable of transmitting between platforms 110 but need not be capable of transmitting outside of the cluster 102 such as, for example, to the distant receiver 104. The short range transceiver 114 thus need only be capable of transmitting data over the distance $D_C$. The power required by the short range transceiver 114 to transmit to the other platforms 110 within the cluster 102 and thus over the distance $D_C$ is referred to herein as power $P_C$. Power $P_R$ can be significantly greater than power $P_C$. For example, power $P_R$ can be two, five, ten, twenty, fifty, sixty, eighty, one-hundred, or more times greater than power $P_C$. The data acquisition device 116 can acquire data that is to be transmitted to the receiver 104. For example, the data acquisition device 116 can comprise a surveillance device such as a camera, an eavesdropping device, a micro-phone, or the like.

It is noted that some or all of the platforms 110 can comprise less than all of a transmitter 112, a transceiver 114, and/or a data acquisition module 116. Likewise, the long range transmitter 112 in any platform 110 can instead be a long range transceiver, and the short range transceiver 114 in any platform 110 can instead be a short range transmitter or receiver. Regardless, the transmitter 112 and/or the transceiver 114 can be communications devices capable of transmitting and/or receiving electromagnetic signals such as radio frequency (RF) signals, light pulses, or the like. The transmitter 112 and/or the transceiver 114 can be directional or omni-directional.

Figure 2:
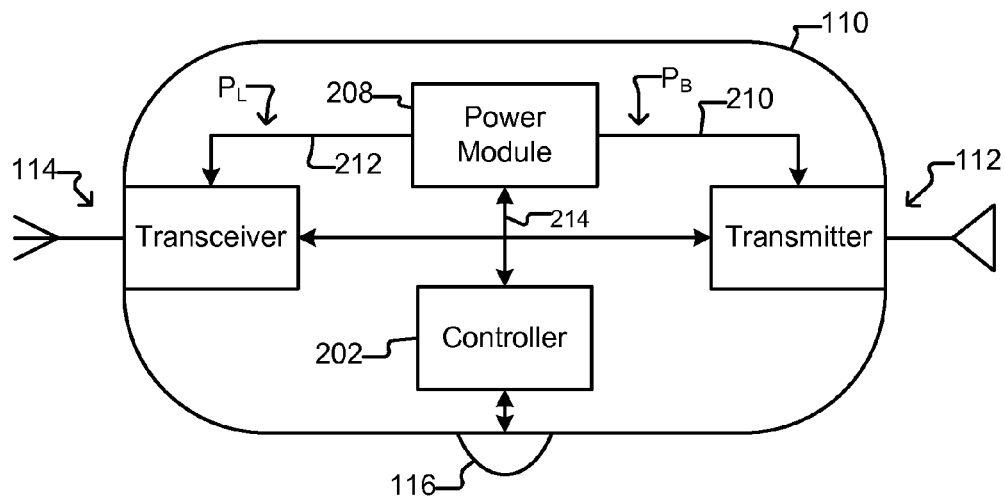
FIG. 2 shows an example of a communications platform according to some embodiments of the invention.

FIG. 2 illustrates an example internal configuration of a platform 110. As shown, in addition to the transmitter 112 and transceiver 114, a platform 110 can also comprise a controller 202 and a power module 208. Any or all of the platforms 110a-110d can be configured as shown in FIG. 2.

The controller 202 can comprise one or more electronic circuits (digital and/or analog), digital processors, and/or digital memories (not shown). The controller 202 can operate in accordance with non-transitory machine readable instructions (e.g., software including firmware or microcode) stored in the memory (not shown) and executed by the processor (not shown), the digital circuitry (not shown), and/or the analog circuitry (not shown). All or any of the processes, procedures, or functions illustrated or discussed herein, including the processes 400 and 1300 illustrated in FIGS. 4 and 13, can be implemented in machine readable instructions and/or circuitry of the controller 202.

The power module 208 can provide power to the platform 110, including the transceiver 114, the transmitter 112, and the controller 202. The power module 208 can be configured to provide low level power $P_L$ continuously at a low power output 212. The power module 208 can also be configured to provide at a high power output 210 periodic bursts $P_B$ of high power for short burst periods $t_B$ separated by charging periods $t_{ch}$. For example, the power module 208 can be configured to provide a power burst $P_B$ for a burst period $t_B$, but the power module 208 is then recharged for a charging period $t_{ch}$ before providing another power burst $P_B$. A charging period $t_{ch}$ can be two, three, four, five, ten, twenty, thirty, forty, fifty, sixty, eighty, one-hundred, or more times greater than the burst period $t_B$.

The power $P_L$ can be greater than or equal to the power $P_C$ (which as discussed above, is the power required by the short range transceiver 114) but less than the power $P_R$ (which as discussed above, is the power required by the long range transmitter 112). The power burst $P_B$, however, can be greater than the power $P_R$. As shown, the power module 208 can provide the low power $P_L$ to the transceiver 114, and the power module 208 can provide the high power bursts $P_B$ to the transmitter 112. The power module 208 can thus provide sufficient power for the transceiver 114 to transmit and receive continuously. The power module 208 can also provide sufficient power for the transmitter 112 to transmit in bursts each lasting a burst period $t_B$, but there is a charging period $t_{ch}$ between each transmission burst by the transmitter 112.

Figure 3:
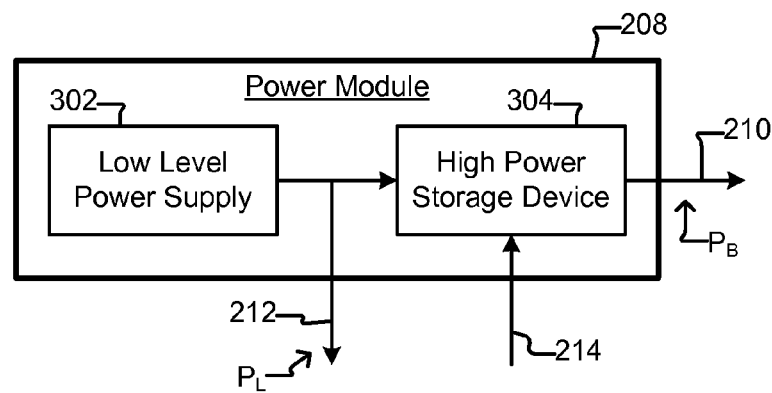
FIG. 3 is an example of a power module in a communications platform according to some embodiments of the invention.

FIG. 3 illustrates an example configuration of the power module 208. As shown, the power module 208 can comprise a low level power supply 302 and a high power storage device 304. The low level power supply 302 can be capable of continuously providing the low level power $P_L$ at the output 212. The high power storage device 304 can be capable of being charged by the power $P_L$ from the power supply 302 over a charging period $t_{ch}$ to store the burst power $P_B$ and then discharging the burst power $P_B$ over a burst period $t_B$ at the burst power output 210 in response to the discharge control signal 214. The high power storage device 304 can thus periodically provide high power bursts $P_B$ each lasting for a burst period $t_B$, but the high power storage device 304 is recharged during a charging period $t_{ch}$ between each power burst $P_B$.

The low level power supply 302 can be, for example, an alternating current (AC) power supply or a direct current (DC) power supply. The high power storage device 304 can comprise, for example, a high storage capacitor or similar electronic storage device.

As discussed above, the low level power $P_L$ continuously provided to the transceiver 114 can be sufficient for the short range transceiver 114 to transmit data over the distance $D_C$. The short range transceiver 114 can thus continuously transmit, and the platforms 110 can thus continuously communicate with each other. As also discussed above, the burst power $P_B$ but not the low level power $P_L$ is sufficient for the long range transmitter 122 to transmit. The high power storage device 304 can thus provide sufficient power to the transmitter 112 to transmit data over the distance $D_R$ to the distant receiver 104 for a relatively short burst time $t_B$, and the high power storage device 304 is then recharged for at least a charging time $t_{ch}$ between transmission bursts. The high power storage device 304 is thus able to provide the power $P_R$ to the transmitter 112, and the transmitter 112 is thus able to transmit data over the distance $D_R$ to the distant receiver 104 during periodic burst periods $t_B$, which are separated by charging periods $t_{ch}$.

FIG. 4 illustrates an example process 400 in which a block of data (i.e., a data block) is partitioned into data partitions and distributed to the support platforms 110b, 110c, 110d for transmission to the distant receiver 104. The process 400 can be performed by the master platform 110a. For example, the process 400 can be performed by the controller 202 in the master platform 110a.

As shown, at step 402, the process 400 can acquire a data block that is to be transmitted to the distant receiver 104. FIG. 5 illustrates an example in which the process 400 acquires a data block 502. The data block 502 can comprise any type of data. For example, the data block 502 can comprise video data, audio data, messages, surveillance data, or the like. The master platform 110a performing the process 400 can acquire the data block 502 in any of many possible ways. For example, the master platform 110a can acquire the data block 502 from its data acquisition device 116, which can be, for example, a surveillance device such as a camera, a listening device (e.g., microphone), an eavesdropping device, or the like. As another example, the master platform 110a can receive the data block from another device (not shown in FIG. 1).

Figure 6:
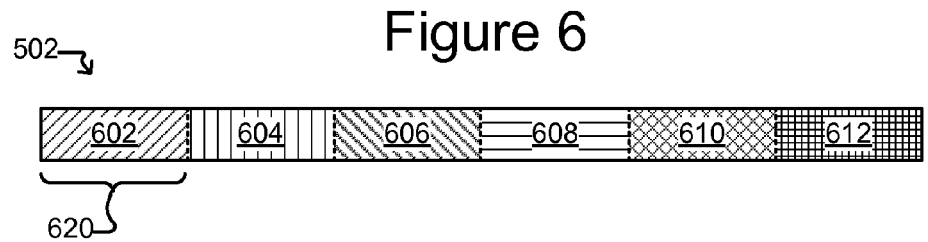
FIG. 6 shows an example of partitioning the data block of FIG. 5 into data partitions according to some embodiments of the invention.

At step 404 of FIG. 4, the process 400 can partition the data block 502 into data partitions. The data partitions, of course, can be smaller than the data block 502. FIG. 6 illustrates an example.

As shown in FIG. 6, the process 400 can partition the data block 502 into data partitions 604, 606, 608, 610, 612 (six are shown but there can be more or fewer). The data block 502 can be partitioned at step 404 such that the length 620 of each data partition 602-612 corresponds to a transmission time that is less than or equal to the burst period $t_B$ discussed above. The length 620 of each data partition 602-612 can thus be less than or equal to the amount of data that a long range transmitter 112 in one of the support platforms 110b-110d can transmit with one power burst $P_B$ from the power module 208. The length 620 of each data partition 602-612 can be the same or different one from another.

At step 406, the process 400 can allocate each of the data partitions from step 404 to one of the support platforms. In some embodiments, the process 400 can allocate the initial n data partitions to each of the support platforms (where n is the number of support platforms), and thereafter allocate, to each support platform, every (i+n)th data partition from the initial data partition allocated to the support platform, where i is each integer from zero to z, and z is one less than the number of data partitions divided by n. That is, z=1−P/n, where P is the number of data partitions from the data block. Put another way, the first n data partitions can be allocated one each to the n support platforms; the next n data partitions can then be allocated one each to the n support platforms; the next n data partitions can then be allocated one each to the n support platforms; and so on until all of the data partitions of step 404 are allocated to one of the support platforms.

Figure 7:
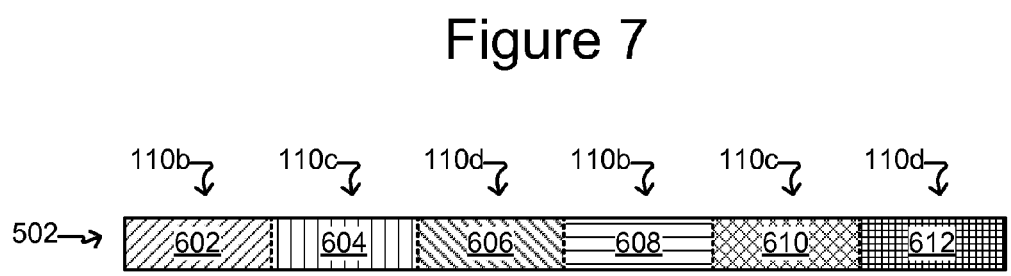
FIG. 7 is an example of allocating the data partitions of FIG. 6 to support platforms according to some embodiments of the invention.

FIG. 7 shows an example in which the number of support platforms—and thus n—is three. This is, however, but an example, and there can be more or fewer support platforms, and n can thus be greater or less than three.

As shown in FIG. 7, the initial three (because n is three in this example) data partitions 602, 604, 606 can be allocated to the support platforms 110b-110d as follows: data partition 602 can be allocated to the first support platform 110b, data partition 604 can be allocated to the second support platform 110c, and data partition 606 can be allocated to the third support platform 110d. As also shown, every third (because n is three in this example) data partition from the initial data partition 602-606 allocated to a particular support platform 110b-110d can be allocated to the same support platform 110b-110d. Thus, in the example of FIG. 7, the remaining data partitions 608-612 can be allocated to the support platforms 110b-110d as follows: data partition 608 is the third partition from the initial partition 602 allocated to the first support platform 110b and is thus also allocated to the first support platform 110b; data partition 610 is the third partition from the initial partition 604 allocated to the second support platform 110c and is thus also allocated to the second support platform 110c; and data partition 612 is the third partition from the initial partition 606 allocated to the third support platform 110d and is thus also allocated to the third support platform 110d.

In other words, the first three (because n is three in this example) data partitions 602-606 are allocated one each to the support platforms 110b-110d. The next three data partitions 608-612 are also allocated one each to the support platforms 110b-110d. Were there more data partitions in the example shown in FIG. 7, each successive additional group of three data partitions would be allocated one each to the support platforms 110b-110d.

Figure 8:
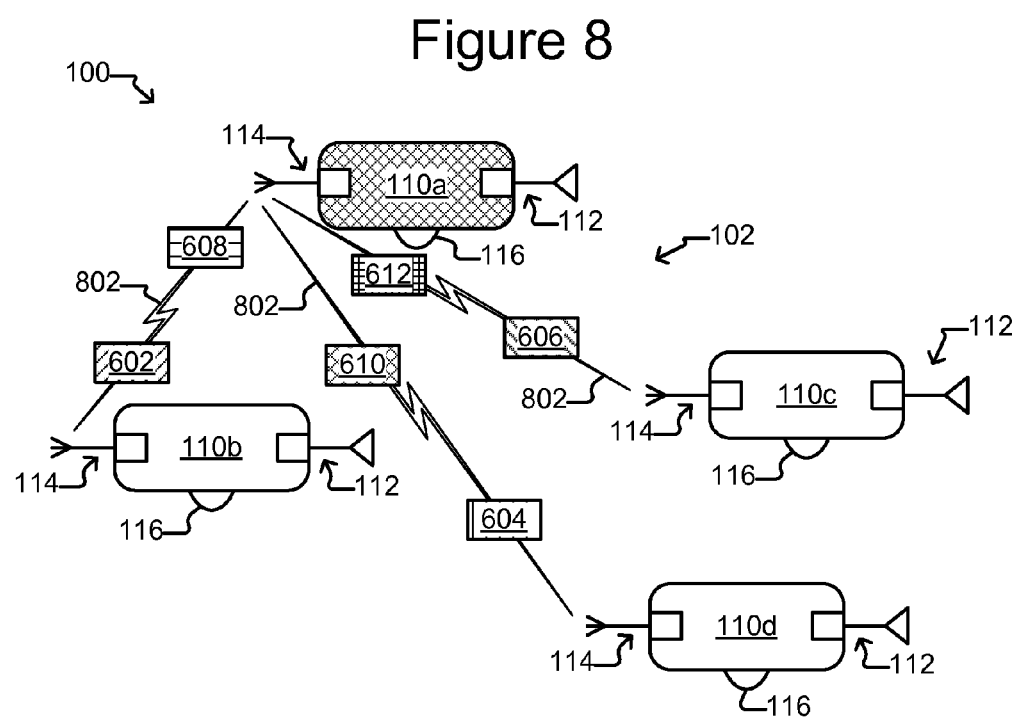
FIG. 8 illustrates an example of transmitting the data partitions to the support platforms according to some embodiments of the invention.

At step 408 of FIG. 4, the process 400 can transmit the data partitions to the support platforms in accordance with the allocation at step 406. FIG. 8 illustrates an example.

As shown in FIG. 8, the master platform 110a can transmit 802 the data partitions 602, 608 to the first support platform 110b; the data partitions 604, 610 to the second support platform 110c; and the data partitions 606, 612 to the third support platform 110d. As also shown, the master platform 110a can transmit 802 the data partitions 602-612 from its short range transceiver 114 to the short range transceivers 114 of the support platforms 110b-110d.

The master platform 110a can direct the data partitions 602-612 to the individual support platforms 110b-110d in any suitable manner. For example, the transmission(s) 802 by which the data partitions 602-612 are sent to the support platforms 110b-110d can each be directed to a specific one of the support platforms 110b-110d. As another example, the transmission(s) 802 can be broadcast to all of the support platforms 110b-110d. In such a case, each particular data partition 602-612 can include an identification field (not shown) that identifies the support platform 110b-110d to which the particular data partition 602-612 is allocated. Each support platform 110b-110d can thus receive all of the data partitions 602-612 but keep only those allocated to the support platform 110b-110d as indicated by the identification fields (not shown) of the data partitions 602-612. The identification field (not shown) can be added to each data partition 602-612, for example, as part of step 406.

Figure 9:
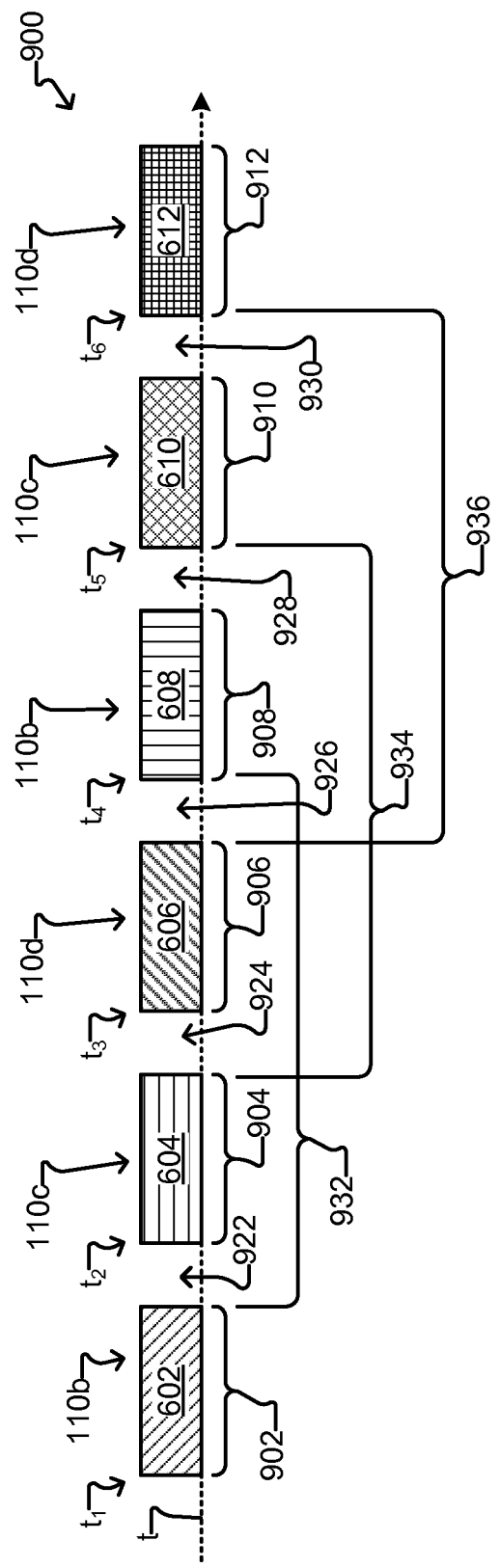
FIG. 9 is an example of synchronizing transmission of the data partitions by the support platforms to the distant receiver according to some embodiments of the invention.

At step 410 of FIG. 4, the process 400 can synchronize long range transmission by the support platforms of the data partitions sent to the support platforms at step 408. FIG. 9 illustrates an example.

In FIG. 9, the data partitions 602-612 are shown on a time line t. As shown, the process 400 can, at step 410, synchronize transmission of the data partitions 602-612 by the support platforms 110b-110d so that the data partitions 602-612 are transmitted to the distant receiver 104 as a sequence 900 in their original order in the data block 502. This is, however, but an example, and the data partitions 602-612 can be transmitted in other sequences or orders.

Thus, as shown, the process 400 can initiate transmission of data partition 602 by the first support platform 110b at time $t_1$. The process 400 can also initiate transmission of data partition 604 by the second support platform 110c at time $t_2$ and transmission of data partition 606 by the third support platform 110d at time $t_3$. The process 400 can initiate transmission of data partition 608 by the first support platform 110b at time $t_4$, transmission of data partition 610 by the second support platform 110d at time $t_5$, and transmission of data partition 612 by the third support platform 110d at time $t_6$.

The transmission periods 902 (of the data partition 602 by the first support platform 110b), 904 (of the data partition 604 by the second support platform 110c), 906 (of the data partition 606 by the third support platform 110b), 908 (of the data partition 608 by the first support platform 110b), 910 (of the data partition 610 by the second support platform 110c), 912 (of the data partition 612 by the third support platform 110b) need not be equal. The foregoing transmission periods 902-912, however, can be less than the burst period $t_B$, which as discussed above, is the time period over which the power module 208 in each support platform 110b-110d can provide burst power $P_B$ that is greater than or equal to the power $P_R$ for the long range transmitter 112 to transmit data to the distant receiver 104.

As also shown in FIG. 9, there can be a time period (referred herein as an idle period) 932, 934, 936 between the end of a transmission of a data partition 602-612 by a particular support platform 110b-110d and the beginning of the next transmission of a data partition 602-612 by the same support platform 110b-110d. Thus, in FIG. 9, idle period 932 is the time between the end of the transmission of the data partition 602 and the beginning of the transmission of the data partition 608 by the first support platform 110b. Idle period 932 is thus an idle period of the first support platform 110b. Similarly, idle period 934 is the time between the end of the transmission of the data partition 604 and the beginning of the transmission of the data partition 610 by the second support platform 110c, and idle period 936 is the time between the end of the transmission of the data partition 606 and the beginning of the transmission of the data partition 612 by the third support platform 110d. Idle period 934 is thus an idle period of the second support platform 110c, and idle period 936 is an idle period of the third support platform 110d. The idle periods 932, 934, 936 of each of the support platforms 110b-110d can be greater than or equal to the charging period $t_{ch}$ of the high power storage device 304 as discussed above.

As further shown in FIG. 9, there can be a time gap 922-930 between the end of the transmission of one of the data partition 602-612 and the beginning of the transmission of a next data partition 602-612 in the sequence 900. Thus, for example, time gap 922 can be between the end of the transmission of the data partition 602 by the first support platform 110b and the beginning of the transmission of the data partition 604 by the second support platform 110c. The time gap 924 can similarly be a time period between the end of the transmission of the data partition 604 by the second support platform 110c and the beginning of the transmission of the data partition 606 by the third support platform 110d. The time gaps 926, 928, 930 can likewise be, respectively, time gaps between the end of transmissions of one of the data partitions 606-610 and the beginning of the transmission of the next data partition 608-612 in the sequence 900. The time gaps 922-930 can be substantially equal or different one from another.

The master platform 110a can synchronize transmission of the data partitions 602-612 by the support platforms 110b-110d at step 410 in any number of ways. For example, the master platform 110a can transmit via its short range transceiver 114 a transmit signal (not shown in FIG. 9) at each of times $t_1$ through $t_6$, which can be received by the support platforms 110b-110d via their transceivers 114. As another example, the master platform 110a can provide with each data partition 602-612 a transmission time for the data partition 602-612. The transmission time can be, for example, a transmission time measured from a synchronization signal. Such transmission time data can be provided, for example, in a field (not shown) appended to each data partition 602-612 at step 404 or 406. At step 410, the master platform 110a can transmit one or more synchronization signals (not shown in FIG. 9) to the support platforms 110b-110d, and each of the support platforms 110b-110d can then transmit each of their respective data partitions 602-612 at the transmission time associated with the respective data partition 602-612 with respect to the synchronization signal(s). The synchronization signal(s) (not shown) can be transmitted by the master platform 110a via its short range transceiver 114 to the short range transceivers 114 of the support platforms 110b-110d.

Figure 10:
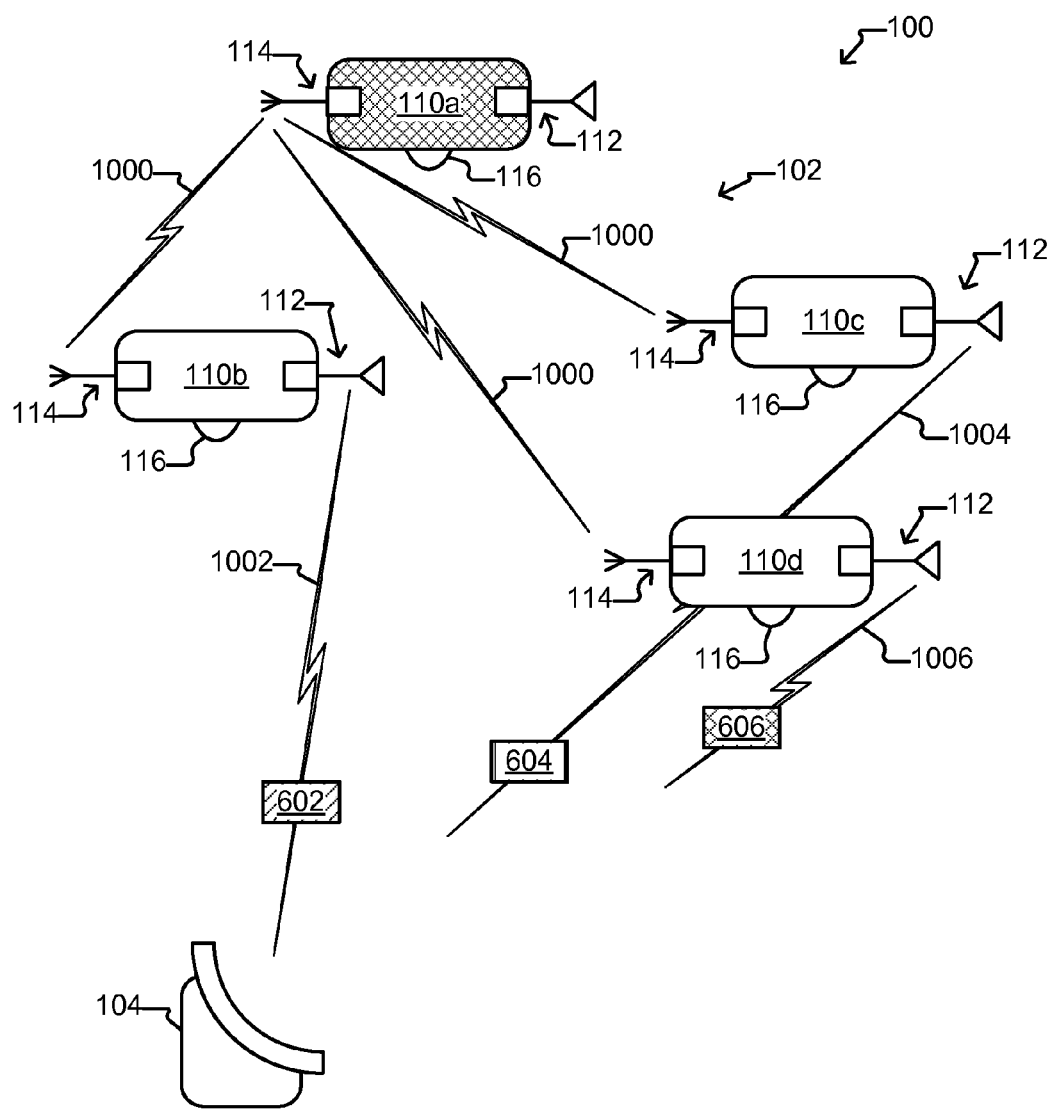
FIGS. 10 and 11 illustrate examples of the support platforms transmitting data partitions to the distant receiver according to some embodiments of the invention.
Figure 11:
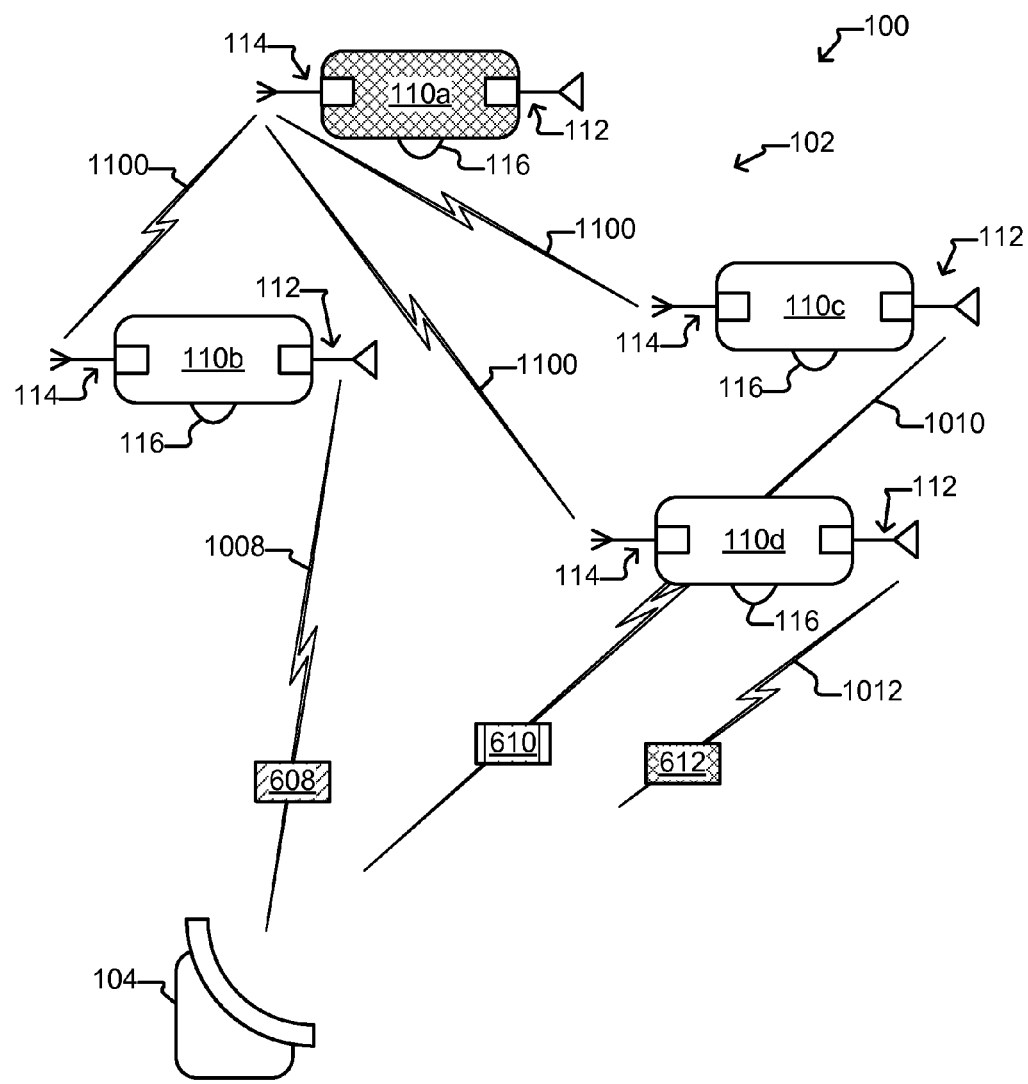

FIGS. 10 and 11 illustrate example transmissions of the sequence 900 of data partitions 602-612 illustrated in FIG. 9.

As shown in FIG. 10, the first support platform 110b can transmit the data partition 602 in a burst transmission 1002 from its long range transmitter 112 to the distant receiver 104. As shown in FIG. 9, the burst transmission 1002 can start at time $t_1$ and last for the transmission period 902. Thereafter, following the time gap 922 (see FIG. 9) after the end of the burst transmission 1002, the second support platform 110c can transmit at $t_2$ the data partition 604 in a burst transmission 1004 from its long range transmitter 112 to the distant receiver 104. Thereafter, following the time gap 924 (see FIG. 9) after the end of the burst transmission 1004, the third support platform 110d can transmit at $t_3$ the data partition 606 in a burst transmission 1006 from its long range transmitter 112 to the distant receiver 104. Signals 1000 in FIG. 10 can be transmit or synchronization signal(s) transmitted from the master platform 110a to the support platforms 110b-110d to synchronize or coordinate the burst transmissions 1002, 1004, 1006 as discussed above.

As shown in FIG. 11, thereafter, following the time gap 924 (see FIG. 9) after the end of the burst transmission 1006, the first support platform 110b can again transmit from its long transmitter 112. In this instance, the first support platform 110b transmits at $t_4$ the data partition 608 in a burst transmission 1008 from its long range transmitter 112 to the distant receiver 104. Thereafter, following the time gap 928 (see FIG. 9) after the end of the burst transmission 1008, the second support platform 110c can again transmit from its long transmitter 112: at $t_5$, the second support platform 110c can transmit the data partition 610 in a burst transmission 1010 from its long range transmitter 112 to the distant receiver 104. Thereafter, following the time gap 930 (see FIG. 9) after the end of the burst transmission 1010, the third support platform 110d can again transmit from its long transmitter 112: at $t_6$, the third support platform 110c can transmit the data partition 612 in a burst transmission 1012 from its long range transmitter 112 to the distant receiver 104. Signals 1100 in FIG. 11 can be transmit or synchronization signal(s) transmitted from the master platform 110a to the support platforms 110b-110d to synchronize or coordinate the burst transmissions 1008, 1010, 1012 as discussed above.

Although FIGS. 7-11 show only the support platforms 110b-110d transmitting data partitions 602-612 via their long range transmitters 112 to the distant receiver 104, the master platform 110a can also transmit some of the data partitions 602-612 via its long range transmitter 112 to the distant receiver 104. In such an embodiment, the master platform 110a can function as the master as discussed above and can also function as one of the support platforms. Thus, in such an embodiment, the master platform 110a can be deemed the master platform 110a and a support platform. At step 406 of FIG. 4, the master platform 110a can thus allocate some, but not all, of the data partitions to itself as though the master platform 110a were one of the support platforms 110b-110d; and at step 408, the master platform 110a can transmit the data partitions allocated to the support platforms 110b-110d as discussed above but keep the data partitions allocated to itself.

Figure 12:
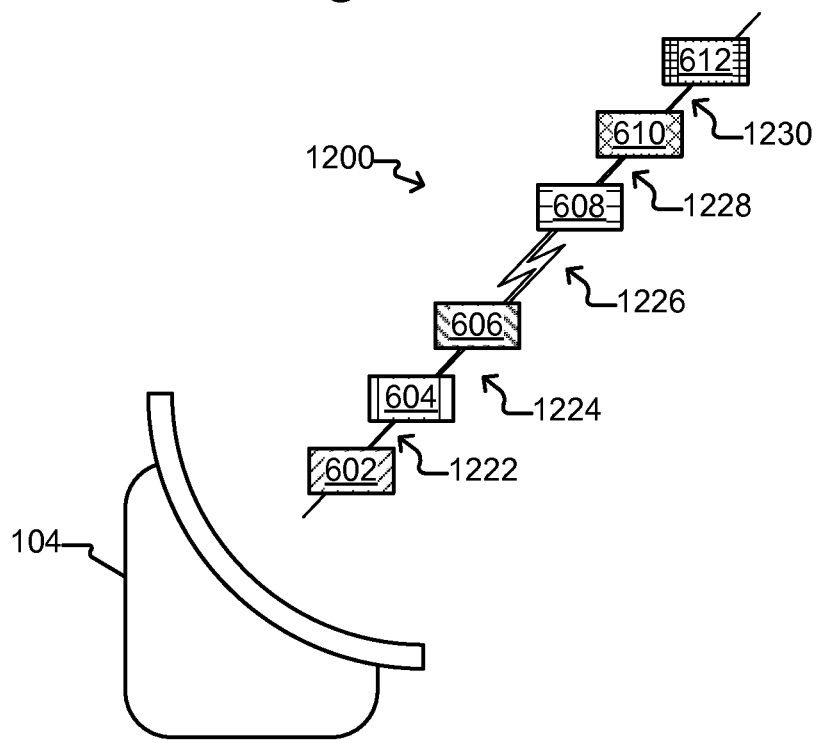
FIG. 12 shows an example of a sequence of data partitions at the distant receiver according to some embodiments of the invention.

As shown in FIG. 12, the distant receiver 104 can receive a sequence 1200 of data partitions 602-612 in the order transmitted by the support platforms 110b-110d. Thus, the distant receiver 104 can receive the data partition 602, followed by the data partition 604, followed by the data partition 606, followed by the data partition 608, followed by the data partition 610, followed by the data partition 612. As also shown, there can be time gaps 1222, 1224, 1226, 1228, 1230 between the data partition 602-612. The sequence 1200 can correspond to the sequence 900 in FIG. 9, and the time gaps 1222-1230 can likewise correspond to the time gaps 922-930.

Figure 13:
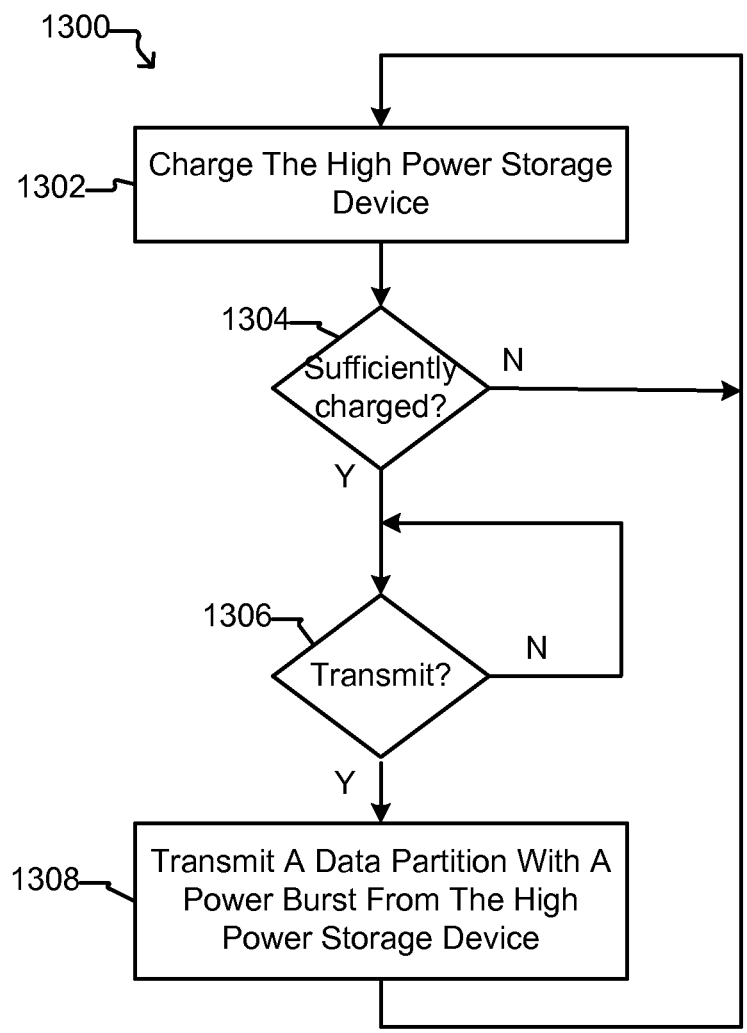
FIG. 13 is an example process by which a support platform can transmit a data partition to the distant receiver according to some embodiments of the invention.

FIG. 13 illustrates a process 1300 that can performed independently by each of the support platforms 110b-110d. For example, the controller 202 in each support platform 110b-110d can perform the process 1300. The master platform 110a can also perform the process 1300 if the master platform 110a is also functioning as one or the support platforms as discussed above. In the discussion that follows, the process 1300 is discussed with reference to the power module 208 configured as shown in FIG. 3. The process 1300, however, is not so limited and can be performed with the power module 208 in other configurations.

As shown in FIG. 13, at step 1302, the process 1300 can charge the high power storage device 304 (see FIG. 3). For example, the low level power $P_L$ from the low level power supply 302 can charge the high power storage 304. During step 1302, the discharge signal 214 can be negative so that the high power storage device 304 does not discharge. Per step 1304, the process 1300 can continue charging the high power storage device 304 until the high power storage device 304 has been charged sufficiently to provide a power burst $P_B$ for the burst period $t_B$ as discussed above after which the process 1300 can wait at step 1306 for a transmit determination.

The transmit determination can be made at step 1306 in any number of possible ways. For example, as discussed above, the master platform 110a can send a transmit signal (e.g., signals 1000, 1100 in FIGS. 11 and 12) that corresponds to a data partition 602-612 generally as discussed above with respect to FIG. 9. Receipt at a support platform 110b-110d of such a transmit signal (not shown in FIG. 13) can cause the process 1300 to make a positive transmit determination at step 1306. As another example, the process 1300 can make a positive determination at step 1306 by determining that a predetermined time period has elapsed since receiving a synchronization signal (e.g., signals 1000, 1100 in FIGS. 11 and 12) from the master platform 110a as discussed above.

When a transmit determination is made at step 1306, the process 1300 can transmit at step 1308 a data partition 602-612 that corresponds to the transmit determination detected at step 1306. The process 1300 can do so by activating the discharge signal 214, which can cause the high power storage device 304 to discharge and thereby provide a power burst $P_B$ for a burst period $t_B$ to the long range transmitter 112. The support platform 110b-110d performing the process 1300 thus transmits the corresponding data partition 602-612 to the distant receiver 104.

Although specific embodiments and applications of the invention have been described in this specification, these embodiments and applications are exemplary only, and many variations are possible.

We claim:

1. A process of transmitting data, said process comprising:
   partitioning a data block into data partitions at a master communications platform;
   allocating each of said data partitions to one of a plurality of support communications platforms located within a distance $D_C$ from said master communications platform; and
   transmitting said data partitions from long range transmitters in said support platforms to a distant receiver located at least a distance $D_R$ from said support platforms, wherein said distance $D_R$ is greater than said distance $D_C$,
   wherein said transmitting comprises, at each one of said support platforms:
     burst transmitting each said data partition allocated to said one of said support platforms by providing a power burst $P_B$ for a burst time period $t_B$ to said long range transmitter in said one of said support platforms, and
     providing a charging time period $t_{ch}$ at said one of said support platforms between each said power burst $P_B$.

2. The process of claim 1, wherein:
   said transmitting further comprises, during each said charging time period $t_{ch}$, charging with a continuous average power $P_a$ a power storage device in said one of said support platforms, and
   said providing comprises discharging said power burst $P_B$ from said power storage device to said long range transmitter in said one of said support platforms.

3. The process of claim 2, wherein said charging time period $t_{ch}$ is at least twenty times greater than said burst time period $t_B$.

4. The process of claim 2, wherein a power level of said power burst $P_B$ is at least two times greater than a power level of said average power $P_a$.

5. The process of claim 2 further comprising transmitting via a short range transmitter in said master platform ones of said data partitions to ones of said support platforms, wherein said short range transmitter is capable of transmitting over said distance $D_C$ but is not capable of transmitting over said distance $D_R$.

6. The process of claim 5, wherein said transmitting via said short range transmitter comprises providing continuously to said short range transmitter power $P_L$, wherein said power burst $P_B$ is at least two times greater than said power $P_L$.

7. The process of claim 1, wherein each said data partition is sufficiently small to be transmitted from one of said long range transmitters in one of said burst time periods $t_B$.

8. The process of claim 1, wherein said transmitting comprises transmitting said data partitions of said data block in a serial sequence with a time gap between each said data partition.

9. The process of claim 1, wherein:
said allocating comprises allocating each subset of n number of said data partitions one each to each of said support platforms, and
said number n is a total number of said support platforms.

10. The process of claim 1 further comprising acquiring said data block with a surveillance device at said master communications platform.

11. The process of claim 1, wherein said distance $D_R$ is at least one-thousand times said distance $D_C$.

12. A cluster of communications platforms, said cluster comprising:
a master communications platform comprising a short range transmitter that requires an amount of power $P_C$ to transmit data over a distance $D_C$; and
support communications platforms each disposed within said distance $D_C$ from said master communications platform, each said support platform comprising a receiver, and a long range transmitter that requires a power $P_R$ to transmit data over a distance $D_R$, wherein said distance $D_R$ is greater than said distance $D_C$ and said power $P_R$ is greater than said power $P_C$;
wherein:
said master platform comprises a power module capable of continuously supplying power $P_L$ to said short range transmitter, wherein said power $P_L$ is greater than said power $P_C$ but less than said power $P_R$;
each one of said support platforms comprises a power module capable of:
supplying continuously average power $P_a$ that is less than said power $P_R$, and
only after a charging time period $t_{ch}$, supplying to said long range transmitter of said support platform a power burst $P_B$ only for a burst time period $t_B$ that is greater than or equal to said power $P_R$.

13. The cluster of claim 12, wherein said power burst $P_B$ is at least two times said average power $P_a$.

14. The cluster of claim 13, wherein said power module in each said support platform comprises:
a power storage device comprising an input and a burst power output, wherein said power storage device is capable of charging sufficiently to discharge at said burst power output said power burst $P_B$ for said burst time period $t_B$ when supplied continuously at said input with said average power $P_a$ for said charging time period $t_{ch}$; and
a power supply capable of continuously supplying said average power $P_a$ to said power storage device.

15. The cluster of claim 14, wherein said charging time period $t_{ch}$ is at least twenty times said burst time period $t_B$.

16. The cluster of claim 12, wherein said master communications platform comprises a controller configured to:
partition a data block into data partitions, and
transmit via said short range transmitter ones of said data partitions to ones of said support platforms.

17. The cluster of claim 16, wherein each said support platform comprises a controller configured to:
transmit one of said data partitions in a burst transmission via said long range transmitter of said support platform, and
control said power module of said support platform to provide said power burst $P_B$ to said long range transmitter of said support platform to power said burst transmission.

18. The cluster of claim 17, wherein said controller of said master communications platform is further configured to synchronize said burst transmissions of each of said support platforms.

19. The cluster of claim 12, wherein said power $P_R$ is at least two times said power $P_C$.

20. The cluster of claim 12, wherein said distance $D_R$ is at least one-thousand times said distance $D_C$.

21. The cluster of claim 12, wherein said power burst $P_B$ is at least two times said power $P_L$.

* * * * *